(12) United States Patent
Jungk

(10) Patent No.: US 7,144,466 B2
(45) Date of Patent: Dec. 5, 2006

(54) DEVICE FOR TURNING UP THE TIRE SIDEWALLS ON A TIRE BUILDING DRUM

(75) Inventor: Andreas Jungk, Wedemark (DE)

(73) Assignee: Continental Aktiengesellschaft, Hannover (DE)

( * ) Notice: Subject to any disclaimer, the term of this patent is extended or adjusted under 35 U.S.C. 154(b) by 313 days.

(21) Appl. No.: 10/755,222

(22) Filed: Jan. 13, 2004

(65) Prior Publication Data
US 2004/0250941 A1 Dec. 16, 2004

(30) Foreign Application Priority Data
Jan. 14, 2003 (DE) ................. 103 00 969

(51) Int. Cl.
*B29D 30/24* (2006.01)
*B29D 30/32* (2006.01)

(52) U.S. Cl. ............... 156/132; 156/135; 156/402; 156/415

(58) Field of Classification Search ............. 156/132, 156/400, 402, 421.4, 415
See application file for complete search history.

(56) References Cited

U.S. PATENT DOCUMENTS 3,184,361 A * 5/1965 Allitt ................ 156/415
3,718,520 A * 2/1973 Leblond ............. 156/400
4,131,500 A   12/1978 Wilde et al.
4,290,472 A * 9/1981 Bryant ............... 156/416
5,772,836 A    6/1998 Ogawa
2001/0050148 A1 12/2001 Terazono

FOREIGN PATENT DOCUMENTS

| DE | 651485 | 10/1937 |
| DE | 1016434 | 9/1957 |
| DE | 2124978 | 12/1971 |
| DE | 4416514 | 11/1994 |
| DE | 19934791 | 7/2000 |
| EP | 1145834 | 10/2001 |
| GB | 2182894 | 4/1987 |

* cited by examiner

Primary Examiner—Geoffrey L. Knable
(74) Attorney, Agent, or Firm—Greenblum & Bernstein, P.L.C.

(57) ABSTRACT

Device for turning up sidewalls of a tire. The device includes a first lever supporting body arranged on a first side of a drum center and being movable in an axial direction. A first lever system pivotally connected to the first lever supporting body. A second lever supporting body arranged on a second side of the drum center and being movable in an axial direction. A second lever system pivotally connected to the second lever supporting body. The first and second sides are arranged on opposite sides of the drum center. A base spindle is adapted to move the first and second lever supporting bodies in an axial synchronous manner relative to each other.

30 Claims, 1 Drawing Sheet

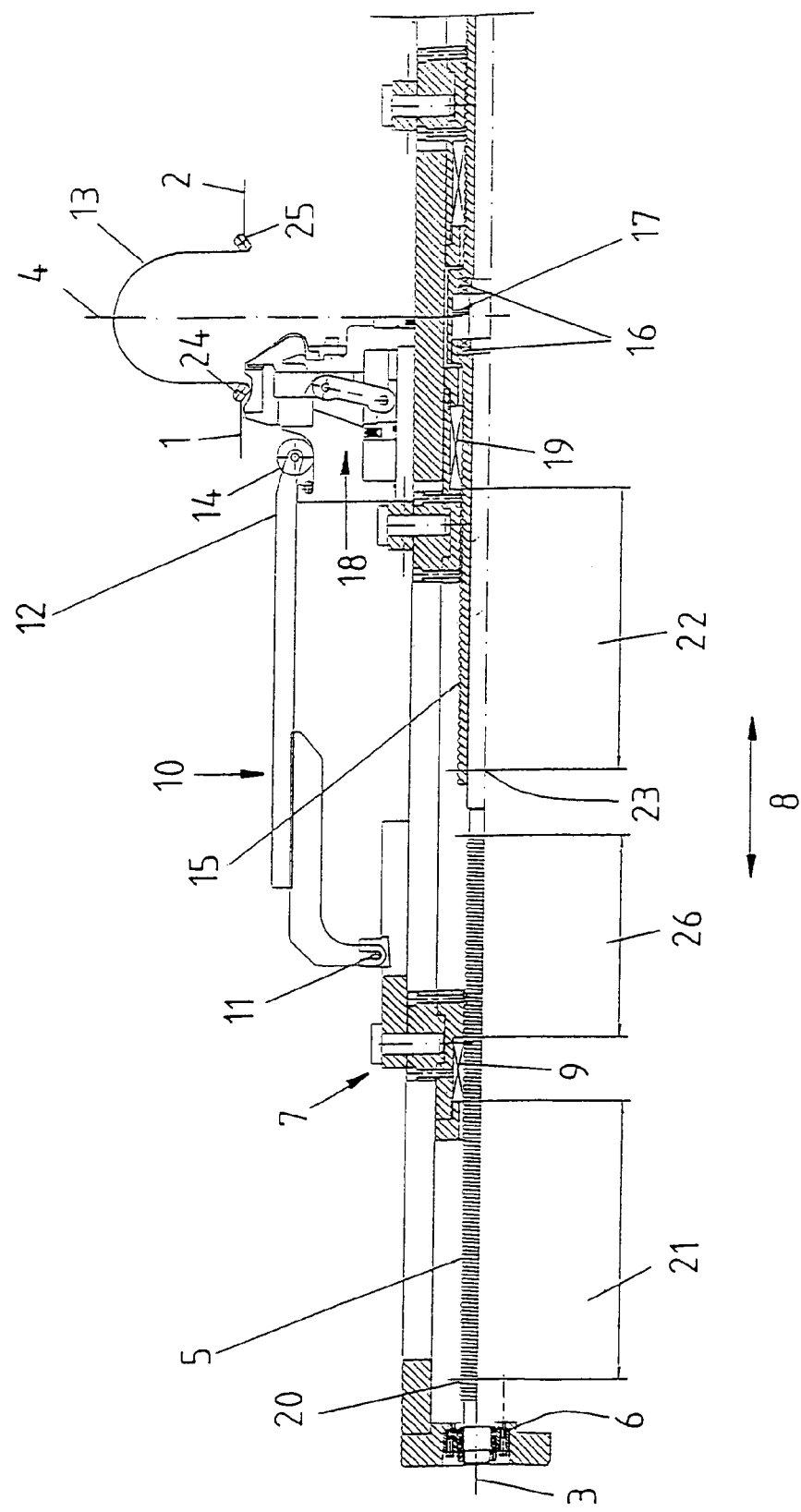

DEVICE FOR TURNING UP THE TIRE SIDEWALLS ON A TIRE BUILDING DRUM

CROSS-REFERENCE TO RELATED APPLICATIONS

The present application claims priority under 35 U.S.C. §119 of German Patent Application No. 103 00 969.8, filed on Jan. 14, 2003, the disclosure of which is expressly incorporated by reference herein in its entirety.

BACKGROUND OF THE INVENTION

1. Field of the Invention

The invention relates to a device for turning up the tire sidewalls on a tire building drum with devices for shaping a tire carcass, whereby the tire building drum features two lever systems arranged essentially and/or generally symmetrically to the drum center, which lever systems are each connected to a lever supporting body in a pivoted manner, whereby the two lever supporting bodies can be moved in the axial direction of the tire building drum.

2. Discussion of Background Information

In the conventional production of new tires, one production step takes place on a tire building drum, in which the tire carcass at first resting flat is shaped by an expansion process. The actual shaping process of the carcass takes place, e.g., via a middle bellows that expands the central area of the carcass. In this process the two outer sidewalls are subsequently turned up on the shaped carcass and thereby folded about the bead core. This process of turning up the tire sidewalls takes place either with so-called side shaping bellows or with a roller lever system arranged in a rim-shaped manner over the circumference. When side shaping bellows are used, two inflating bellows arranged in the area of the sidewall layers are inflated, which inflating bellows in this manner press the sidewalls onto the shaped carcass. The turning up process with the aid of side shaping bellows can have the disadvantage that these bellows do not act all the way up to the shoulder areas of the green tire, making manual finishing operation necessary. Furthermore, the side shaping bellows are subject to a high wear, making necessary a correspondingly frequent replacement, which is associated with a high expenditure of time.

Turning up sidewalls with the aid of a roller lever system is disclosed, e.g., in DE 199 34 791 C1. With this device the spreading apart of the roller lever system takes place via a pneumatic drive that comprises two separate pneumatic cylinders. The two pneumatic cylinders are acted on separately with compressed air, spreading apart the tire lever system and turning up the sidewalls on the carcass.

A major disadvantage with this principle is that, e.g., due to different frictional effects, the spreading apart of the opposite tire lever systems does not always occur simultaneously or suddenly. The consequence of the two roller lever systems being spread apart at different times is that the sidewalls are not pressed uniformly against the shaped carcass and a defective connection between the two material layers thus occurs, which in turn can lead to tire wastage.

SUMMARY OF THE INVENTION

The invention provides for a device for turning up the tire sidewalls on a tire building drum with which the tire sidewalls are turned up on both sides of the shaped carcass simultaneously and continuously.

The invention also provides that both lever supporting bodies can be moved via a base spindle in axial direction relative to one another in a synchronous manner.

One advantage of the invention can be seen in particular in that through the device according to the invention the two opposite lever systems, which are connected to the lever supporting body in a pivoted manner, spread apart simultaneously and thus turn up the two tire sidewalls on both sides of the carcass in a synchronous and continuous manner. The simultaneous turning up of the tire sidewalls causes the material layers to be pressed against the shaped carcass respectively with the same contact pressure, through which a high connection quality between the material layers is achieved. The use of the spindles further causes a continuously constant movement of the lever system, which contributes to an increase in connection quality and thus leads to less production wastage.

In an advantageous embodiment of the invention a hollow spindle with two movable core stretching devices is arranged in a coaxial manner around the base spindle. The hollow spindle is provided for the axial movement of the core stretching devices. When embodied as a hollow spindle, it has the advantage, e.g., that it is integrated in the tire building drum in a space-saving manner.

In a further advantageous embodiment of the invention the rotation of the hollow spindle can be coupled to the rotation of the base spindle via a coupling. The coupling has the advantage that the base spindle simultaneously drives the hollow spindle via the coupling and thus a separate drive of the hollow spindle can be omitted.

In a further advantageous embodiment of the invention the rotation of the hollow spindle can be decoupled from the rotation of the base spindle via the coupling. When spreading apart the lever system only the lever supporting bodies should move further towards one another, whereas the two core stretching devices in contrast should remain stationary. The separation of the rotation of the hollow spindle from the rotation of the base spindle is advantageously achieved via the coupling.

In a further advantageous embodiment of the invention the hollow spindle is supported on the base spindle via at least one ball bearing. The ball bearing minimizes the frictional effects as soon as the coupling is uncoupled and only the base spindle continues to rotate.

In another advantageous embodiment of the invention the rotation of the hollow spindle can be stopped via a braking device. The braking device blocks the rotation of the hollow spindle completely and thus ensures that the core stretching devices can no longer move.

In another advantageous embodiment of the invention the base spindle and the hollow spindle are embodied as ball roller spindle. The embodiment of the spindles as ball roller spindles has the advantage of low frictional effects. Furthermore, through the use of this type of spindle a high precise linear movement of the lever support body is achieved.

In another advantageous embodiment of the invention the base spindle features a smooth material surface in the area in which it passes into the hollow spindle. The hollow spindle can thus be supported on its inside directly on the outside of the hollow spindle, whereby only low frictional losses occur between the two spindles in the uncoupled state.

The invention also provides for a device for turning up sidewalls of a tire, wherein the device comprises a first lever supporting body arranged on a first side of a drum center and being movable in an axial direction, a first lever system pivotally connected to the first lever supporting body, a second lever supporting body arranged on a second side of the drum center and being movable in an axial direction, a second lever system pivotally connected to the second lever supporting body, and a base spindle adapted to move the first and second lever supporting bodies in an axial synchronous manner relative to each another, wherein the first and second sides are arranged on opposite sides of the drum center.

The device may further comprise devices for shaping a tire carcass. The device may be arranged on a tire building drum. The device may further comprise a hollow spindle. The device may further comprise first and second movable core stretching devices respectively arranged on the first and second sides of the drum center. The first and second movable core stretching devices may be coaxially arranged around the base spindle. The first and second movable core stretching devices may be coaxially arranged around the hollow spindle.

The device may further comprise first and second movable core stretching devices respectively arranged on the first and second sides of the drum center. The first and second movable core stretching devices may be coaxially arranged around the base spindle.

The device may further comprise an externally threaded hollow spindle and first and second movable core stretching devices threadably engaging the hollow spindle.

The device may further comprise a hollow spindle rotatably connected to the base spindle, whereby rotation of the base spindle causes the hollow spindle to rotate.

The device may further comprise a hollow spindle and a coupling device, wherein the coupling device is adapted to couple the base spindle to the hollow spindle.

The device may further comprise a hollow spindle and a coupling device, wherein the coupling device is adapted to rotatably connect the base spindle to the hollow spindle.

The device may further comprise a hollow spindle and a coupling device, wherein the coupling device is adapted to connect and disconnect the base spindle to the hollow spindle.

The device may further comprise a hollow spindle and a coupling device, wherein the coupling device is adapted to couple and uncouple the hollow spindle to the base spindle.

The device may further comprise a hollow spindle supported on the base spindle via at least one ball bearing.

The device may further comprise a hollow spindle and a braking device adapted to stop a rotation of the hollow spindle.

The device may further comprise a hollow spindle, wherein each of the base spindle and the hollow spindle comprises ball roller spindle.

The device may further comprise a hollow spindle surrounding a portion of the base spindle, wherein the portion of the base spindle comprises a smooth surface.

The invention also provides for a method of turning up sidewalls of a tire in the device described above, wherein the method comprises rotating the base spindle, moving the first lever supporting body towards the drum center, moving the second lever supporting body towards the drum center, and pivoting outwardly the first and second lever systems, wherein the first and second lever systems move the sidewalls towards a carcass.

The invention also provides for a method of turning up sidewalls of a tire in the device described above, wherein the method comprises rotating the base spindle, moving the first lever supporting body towards the drum center, moving the second lever supporting body towards the drum center, causing a hollow spindle to rotate with the base spindle, and pivoting outwardly the first and second lever systems, wherein the first and second lever systems move the sidewalls towards a carcass.

The invention also provides for a method of turning up sidewalls of a tire in the device described above, wherein the method comprises rotating the base spindle, moving the first lever supporting body towards the drum center, moving the second lever supporting body towards the drum center, causing a hollow spindle to rotate with the base spindle, moving first and second movable core stretching devices towards the drum center via the hollow spindle, and pivoting outwardly the first and second lever systems, wherein rolls of the first and second lever systems move the sidewalls towards a carcass.

The invention also provides for a device for turning up sidewalls of a tire, wherein the device comprises an externally threaded base spindle, an externally threaded hollow surrounding at least a portion of the base spindle, a first lever supporting body arranged on a first side of a drum center, the first lever supporting body being movable in an axial direction by rotation of the base spindle, a first lever system comprising a plurality of levers pivotally connected to the first lever supporting body, a second lever supporting body arranged on a second side of the drum center, the second lever supporting body being movable in an axial direction by rotation of the base spindle, and a second lever system comprising a plurality of levers pivotally connected to the second lever supporting body, wherein the first and second sides are arranged on opposite sides of the drum center.

The invention also provides for a method of turning up sidewalls of a tire in the device described above, wherein the method comprises rotating the base spindle, moving the first lever supporting body towards the drum center, moving the second lever supporting body towards the drum center, and pivoting outwardly the first and second lever systems, wherein the first and second lever systems move the sidewalls towards a carcass.

The invention also provides for a method of turning up sidewalls of a tire in the device described above, wherein the method comprises rotating the base spindle, moving the first lever supporting body towards the drum center, moving the second lever supporting body towards the drum center, causing the hollow spindle to rotate with the base spindle, and pivoting outwardly the first and second lever systems, wherein the first and second lever systems move the sidewalls towards a carcass.

The invention also provides for a method of turning up sidewalls of a tire in the device described above, wherein the method comprises rotating the base spindle, moving the first lever supporting body towards the drum center, moving the second lever supporting body towards the drum center, causing the hollow spindle to rotate with the base spindle, moving first and second movable core stretching devices towards the drum center via the hollow spindle, and pivoting outwardly the first and second lever systems, wherein rolls of the first and second lever systems move the sidewalls towards a carcass.

The invention also provides for a device for turning up sidewalls of a tire, wherein the device comprises an externally threaded base spindle, an externally threaded hollow surrounding at least a portion of the base spindle, a first lever supporting body arranged on a first side of a drum center, the first lever supporting body being movable in an axial direction by rotation of the base spindle, a first lever system pivotally connected to the first lever supporting body, a second lever supporting body arranged on a second side of the drum center, the second lever supporting body being movable in an axial direction by rotation of the base spindle, a second lever system pivotally connected to the second lever supporting body, a first movable core stretching device that can move towards the drum center via the hollow spindle, and a second movable core stretching device that can move towards the drum center via the hollow spindle, wherein the first and second sides are arranged on opposite sides of the drum center.

The device may further comprises a coupling device, wherein the coupling device is adapted to couple and uncouple the hollow spindle to the base spindle.

The invention also provides for a method of turning up sidewalls of a tire in the device described above, wherein the method comprises rotating the base spindle, moving the first lever supporting body towards the drum center, moving the second lever supporting body towards the drum center, coupling the hollow spindle to the base spindle via the coupling device, moving first and second movable core stretching devices towards the drum center via the hollow spindle, and pivoting outwardly the first and second lever systems, wherein the first and second lever systems move the sidewalls towards a carcass.

The invention also provides for a method of turning up sidewalls of a tire in the device described above, wherein the method comprises rotating the base spindle, moving the first lever supporting body towards the drum center, moving the second lever supporting body towards the drum center, causing the hollow spindle to rotate with the base spindle, moving first and second movable core stretching devices towards the drum center via the hollow spindle, and pivoting outwardly the first and second lever systems, wherein the first and second lever systems move the sidewalls towards a carcass.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

The single FIGURE shows a partial section of the device according to the invention for turning up the tire sidewalls 1 and 2 and a tire building drum.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The tire building drum is installed essentially in an axial symmetrical manner relative to a drum axis 3 and to a drum center 4. Thus, the invention is shown in partial form. Moreover, because the respectively opposite components are generally identical, they are not shown in the FIGURE. A base spindle 5 is mounted in a rotatable manner via a ball bearing 6 in the tire building drum and is driven, e.g., via a belt drive (not shown). A lever supporting body 7 is connected to a spindle nut 9, through which the lever supporting body 7 is moved through the rotation of the base spindle 5 in axial direction 8 towards the drum center 4. In this regard, the internal threads of the nut 9 threadably engages the external threads of the spindle 5. On the lever supporting body 7 is arranged a lever system 10. The lever system 10 is connected in a pivoted manner to the bearing(s) 11.

The lever system 10 comprises a plurality of roller levers 12 arranged around the drum axis 3, which roller levers are connected in a pivoted manner to the lever supporting body 7. During axial movement of the lever supporting body 7 towards the drum center 4, the individual roller levers 12 spread apart. This occurs when roll(s) 14 engage a tapered surface a core stretching device 18. In this manner, the levers 12 turn up the sidewall 1 on the already shaped carcass 13. During this process, the roller(s) and/or roll(s) 14 supported on the roller lever(s) 12 presses the sidewall 1 against the outside of the carcass 13, thus connecting the layers (e.g., two layers) to one another. The corresponding devices arranged on the opposite side of drum center 4 are generally identical to devices 7, 11, 10 and 14. By way of example, turn up of the side walls means that each sidewall 1, 2 is moved and/or rotated from a generally horizontal position (as shown in the FIGURE) to a generally vertical position (not shown) against the carcass 13.

The base spindle 5 is connected throughout and in an axial symmetrical manner to the drum center 4 and on the opposite side a second lever supporting body (not shown in the FIGURE) is connected in a mirror inverted manner to a corresponding lever system with the base spindle 5. The external thread of the base spindle 5 on the side opposite the drum center 4 has an oppositely oriented thread pitch of equal size, so that both lever support bodies 7 move towards one another during the rotation of the base spindle 5 in a synchronous manner centrosymmetrically to the drum center 4. The consequence of this synchronous movement is that both lever systems spread apart simultaneously, symmetrically and continuously, through which the two sidewalls 1 and 2 are turned up simultaneously on the shaped carcass 13.

A hollow spindle 15 is arranged in the center region of the base spindle 5 and coaxial to it, which hollow spindle 15 is supported via four ball bearings 16 on the base spindle 5. The two spindles 5 and 15 are separated by a gap and/or clearance of small dimension. The base spindle 5 has a smooth surface in the center region (e.g., it is not threaded in this center region) and thus has in this region the function of a through shaft. The base spindle 5 is coupled to the hollow spindle 15 so as to cause the spindle 15 to rotate therewith. This occurs via a coupling 17 that can be switched pneumatically, electrically, hydraulically or mechanically.

A core stretching device 18 is arranged on the hollow spindle 15 in a coaxial manner. This core stretching device 18 can be moved in axial direction 8 via the spindle nut 19 and the rotation of the hollow spindle 15. In this regard, the internal threads of the device 18 threadably engages the external threads of the spindle 15. A second core stretching device (not shown in the FIGURE but is generally identical to device 18) is arranged in an axial symmetrical manner on the side opposite the drum center 4, which core stretching device is likewise moved to the drum center 4 via the hollow spindle 15 in axial direction 8 synchronously to the first core stretching device 18.

The method of manufacturing the tire on the tire building drum begins first with the shaping process in which the coupling 17 is switched such that the hollow spindle 15 and the base spindle 5 rotate with the same rotational speed. In this process the lever supporting body 7 moves out of position 20 by the distance 21 in the direction of the drum center 4. Since the coupling 17 couples spindle 5 to spindle 15, the hollow spindle 15 likewise rotates and thus moves the core stretching device 18 from the starting position 23 by the distance 22 to the drum center 4. The lever supporting body 7 and the core stretching device 18 are moved in a generally parallel manner at the same speed, since the base spindle 5 and the hollow spindle 15 have the same thread pitch. The bead cores 24 and 25 are thereby moved towards the drum center 4 and at the same time the carcass 13 is shaped. Subsequently the hollow spindle 15 is decoupled from the rotation of the base spindle 5 via the coupling 17 and at the same time stopped via a braking device integrated in the coupling 17, so that the core stretching device can not move further. Next the turning up of the tire sidewalls 1 and 2 starts, whereby the base spindle 5 continues to rotate, moves the lever supporting body 7 by the distance 26 to the drum center 4 and thus spreads apart the lever system 10. With this process from both sides, in a synchronous manner, the sidewalls 1 and 2 are turned up on the carcass 13 simultaneously and continuously and thus the tire layers are connected to one another firmly.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE NUMBERS

1 Left tire sidewall
2 Right tire sidewall
3 Drum axis
4 Drum center
5 Base spindle
6 Ball bearing
7 Lever supporting body
8 Axial direction
9 Spindle nut
10 Lever system
11 Bearing
12 Roller lever
13 Carcass
14 Roll
15 Hollow spindle
16 Ball bearing
17 Coupling
18 Core spreading device
19 Spindle nut
20 Starting position of the lever supporting body
21 Distance that the lever supporting body covers during shaping
22 Distance that the core spreading device covers during shaping
23 Starting position of the core stretching device
24 Bead core
25 Bead core
26 Distance that only the lever supporting body covers during turning up the tire sidewall

What is claimed:

1. A device for turning up sidewalls of a tire, the device comprising:
   a first lever supporting body arranged on a first side of a drum center and being movable in an axial direction;
   a first lever system pivotally connected to the first lever supporting body;
   a second lever supporting body arranged on a second side of the drum center and being movable in an axial direction;
   a second lever system pivotally connected to the second lever supporting body;
   a base spindle adapted to move the first and second lever supporting bodies in an axial synchronous manner relative to each another;
   first and second movable core stretching devices arranged on the first and second sides of the drum center; and
   a hollow spindle that rotates relative to the base spindle, the hollow spindle being structured and arranged to move the first and second core stretching devices in the axial direction while the base spindle moves the first and second lever supporting bodies,
   wherein the first and second sides are arranged on opposite sides of the drum center.

2. The device of claim 1, wherein the device further comprises devices for shaping a tire carcass.

3. The device of claim 1, wherein the device is arranged on a tire building drum and wherein the first and second lever systems are symmetric.

4. The device of claim 1, wherein the first and second movable core stretching devices are coaxially arranged around the base spindle.

5. The device of claim 1, wherein the first and second movable core stretching devices are coaxially arranged around the hollow spindle.

6. The device of claim 1, wherein the hollow spindle is externally threaded and the first and second movable core stretching devices threadably engage the hollow spindle.

7. The device of claim 1, wherein the hollow spindle is rotatably connected to the base spindle, whereby rotation of the base spindle causes the hollow spindle to rotate.

8. The device of claim 1, further comprising a coupling device, wherein the coupling device is adapted to couple the base spindle to the hollow spindle.

9. The device of claim 1, further comprising a coupling device, wherein the coupling device is adapted to switchably connect the base spindle to the hollow spindle.

10. The device of claim 1, further comprising a coupling device, wherein the coupling device is adapted to connect and disconnect the base spindle to the hollow spindle one of pneumatically, electrically, hydraulically, or mechanically.

11. The device of claim 1, further comprising a coupling device, wherein the coupling device is adapted to rotatably couple and uncouple the hollow spindle to the base spindle.

12. The device of claim 1, wherein the hollow spindle is supported on the base spindle via at least one ball bearing.

13. The device of claim 1, further comprising a braking device adapted to stop a rotation of the hollow spindle.

14. The device of claim 1, wherein each of the base spindle and the hollow spindle comprises a ball roller spindle.

15. The device of claim 1, wherein the hollow spindle surrounds a portion of the base spindle, and wherein the portion of the base spindle comprises a smooth surface.

16. A method of turning up sidewalls of a tire in the device of claim 1, the method comprising:
rotating the base spindle;
moving the first and second lever supporting bodies towards the drum center in a synchronous manner;
pivoting outwardly the first and second lever systems,
wherein the first and second lever systems move the sidewalls towards a carcass.

17. A method of turning up sidewalls of a tire in the device of claim 1, the method comprising:
rotating the base spindle;
moving the first lever supporting body towards the drum center;
moving the second lever supporting body towards the drum center;
causing the hollow spindle to rotate with the base spindle; and
pivoting outwardly the first and second lever systems,
wherein the first and second lever systems move the sidewalls towards a carcass.

18. A method of turning up sidewalls of a tire in the device of claim 1, the method comprising:
rotating the base spindle;
moving the first lever supporting body towards the drum center;
moving the second lever supporting body towards the drum center;
causing the hollow spindle to rotate with the base spindle;
moving the first and second movable core stretching devices towards the drum center via the hollow spindle; and
pivoting outwardly the first and second lever systems,
wherein rolls of the first and second lever systems move the sidewalls towards a carcass.

19. The device of claim 1, further comprising a coupling device, wherein the coupling device is adapted to couple and uncouple the hollow spindle to the base spindle.

20. A method of turning up sidewalls of a tire in the device of claim 19, the method comprising:
rotating the base spindle;
moving the first lever supporting body towards the drum center;
moving the second lever supporting body towards the drum center;
coupling the hollow spindle to the base spindle via the coupling device;
moving the first and second movable core stretching devices towards the drum center via the hollow spindle; and
pivoting outwardly the first and second lever systems,
wherein the first and second lever systems move the sidewalls towards a carcass.

21. The device of claim 1, wherein the base spindle threadably engages the first and second lever supporting bodies and wherein the hollow spindle threadably engages the first and second core stretching devices.

22. The device of claim 1, further comprising a coupling device that, in one position, couples the base spindle to the hollow spindle so that the base spindle causes rotation of the hollow spindle, and that, in another position, uncouples the hollow spindle from the base spindle so that the base spindle rotates without causing rotation of the hollow spindle.

23. The device of claim 22, wherein the coupling device comprises a braking device that prevents rotation of the hollow spindle and axial movement of the first and second core stretching devices.

24. The device of claim 1, further comprising a shaft which supports the first and second lever supporting bodies and the first and second core stretching devices.

25. A device for turning up sidewalls of a tire, the device comprising:
an externally threaded base spindle;
an externally threaded hollow spindle surrounding at least a portion of the base spindle;
a first lever supporting body arranged on a first side of a drum center;
the first lever supporting body being movable in an axial direction by rotation of the base spindle;
a first lever system comprising a plurality of levers pivotally connected to the first lever supporting body;
a second lever supporting body arranged on a second side of the drum center;
the second lever supporting body being movable in an axial direction by rotation of the base spindle;
a second lever system comprising a plurality of levers pivotally connected to the second lever supporting body; and
first and second movable core stretching devices arranged on the first and second sides of the drum center and threadably engaging the hollow spindle,
wherein the first and second sides are arranged on opposite sides of the drum center.

26. A method of turning up sidewalls of a tire in the device of claim 25, the method comprising:
rotating the base spindle;
moving the first lever supporting body towards the drum center;
moving the second lever supporting body towards the drum center; and
pivoting outwardly the first and second lever systems,
wherein the first and second lever systems move the sidewalls towards a carcass.

27. A method of turning up sidewalls of a tire in the device of claim 25, the method comprising:
rotating the base spindle;
moving the first lever supporting body towards the drum center;
moving the second lever supporting body towards the drum center;
causing the hollow spindle to rotate with the base spindle;
pivoting outwardly the first and second lever system; and
at least one of:
decoupling the hollow spindle from the base spindle; and
stopping the hollow spindle while the base spindle rotates,
wherein the first and second lever systems move the sidewalls towards a carcass.

28. A method of turning up sidewalls of a tire in the device of claim 25, the method comprising:
rotating the base spindle;
moving the first lever supporting body towards the drum center;
moving the second lever supporting body towards the drum center;

causing the hollow spindle to rotate with the base spindle;

moving the first and second movable core stretching devices towards the drum center via the hollow spindle; and pivoting outwardly the first and second lever systems, wherein rolls of the first and second lever systems move the sidewalls towards a carcass.

29. A device for turning up sidewalls of a tire, the device comprising:

an externally threaded base spindle;

an externally threaded hollow spindle surrounding at least a portion of the base spindle;

a first lever supporting body arranged on a first side of a drum center;

the first lever supporting body being movable in an axial direction by rotation of the base spindle;

a first lever system pivotally connected to the first lever supporting body;

a second lever supporting body arranged on a second side of the drum center;

the second lever supporting body being movable in an axial direction by rotation of the base spindle;

a second lever system pivotally connected to the second lever supporting body;

a first movable core stretching device that is movable axially towards the drum center via rotation of the hollow spindle; and a second movable core stretching device that is movable axially towards the drum center via rotation of the hollow spindle, wherein the first and second sides are arranged on opposite sides of the drum center.

30. A method of turning up sidewalls of a tire in the device of claim 29, the method comprising:

rotating the base spindle;

moving the first lever supporting body towards the drum center;

moving the second lever supporting body towards the drum center;

causing the hollow spindle to rotate with the base spindle;

moving the first and second movable core stretching devices towards the drum center via the hollow spindle; and pivoting outwardly the first and second lever systems, wherein the first and second lever systems move the sidewalls towards a carcass.

* * * * *